United States Patent [19]
Thumm et al.

[11] Patent Number: 5,339,504
[45] Date of Patent: Aug. 23, 1994

[54] TOOL TURRET WITH REDUCED SWITCHING TIMES

[75] Inventors: Helmut Thumm, Metzingen; Frieder Allgaier, Grafenberg, both of Fed. Rep. of Germany

[73] Assignee: Sauter Feinmechanik GmbH, Metzingen, Fed. Rep. of Germany

[21] Appl. No.: 145,516

[22] Filed: Nov. 4, 1993

[30] Foreign Application Priority Data

Nov. 13, 1992 [DE] Fed. Rep. of Germany ....... 4238281

[51] Int. Cl.$^5$ .............................................. B23B 29/32
[52] U.S. Cl. ............................. 29/48.5 A; 29/48.5 R; 74/813 C; 74/813 L
[58] Field of Search ................. 29/48.5 R, 48.5 A, 39, 29/35.5; 74/813 L, 821, 813 C, 825; 82/159, 121

[56] References Cited

U.S. PATENT DOCUMENTS

| 4,507,993 | 4/1985 | Silverman et al. | 29/48.5 R X |
| 4,524,655 | 6/1985 | Waldron et al. | 29/48.5 R X |
| 4,944,198 | 7/1990 | Natale et al. | 74/813 L X |
| 4,972,744 | 11/1990 | Sauter et al. | 29/48.5 R X |
| 4,989,303 | 2/1991 | Sauter et al. | 29/48.5 A |
| 4,991,474 | 2/1991 | Thumm et al. | 74/813 L X |
| 5,067,371 | 11/1991 | Sauter et al. | 29/48.5 A X |

FOREIGN PATENT DOCUMENTS

| 1552553 | 4/1970 | Fed. Rep. of Germany .... 74/813 C |
| 2536004 | 2/1977 | Fed. Rep. of Germany ... 29/48.5 A |

OTHER PUBLICATIONS

Lueger, Lexikon der Technik, 4th Edition, vol. 7, pp. 141–142, 1965.

*Primary Examiner*—William Briggs
*Attorney, Agent, or Firm*—Roylance, Abrams, Berdo & Goodman

[57] ABSTRACT

A tool turret includes a turret housing and a turret head rotatably mounted in and relative to the turret housing to selectable angular positions about a rotational axis. A preliminary indexing bolt secures the turret head in one of the angular positions following movement of the turret head between angular positions. A three-phase synchronous motor forms a rotary drive for the turret head and has at least first and second sets of pole pairs. The first set provides a first indexing speed. The second set has a smaller number of pole pairs then the first set and provides a second indexing speed. An interlocking member securely interlocks the turret head in any of angular positions. The interlocking member is axially slidable along the rotational axis between an interlocking position, in which the interlocking member teeth simultaneously engage the teeth and tooth spaces of the turret housing and the turret head and a contact position in which contact surfaces of the interlocking member and the turret housing engage, precluding engagement of the teeth of the interlocking member and the turret housing in any position other than the selectable angular positions of the turret head. Gears couple the motor to the turret head such that the turret head reaches an indexing speed limited by characteristics of the preliminary indexing bolt. A control operates the motor with the first set of pole pairs at a time to ensure deceleration of the turret head to the first indexing speed before movement of the turret head is stopped by the preliminary indexing bolt.

10 Claims, 5 Drawing Sheets

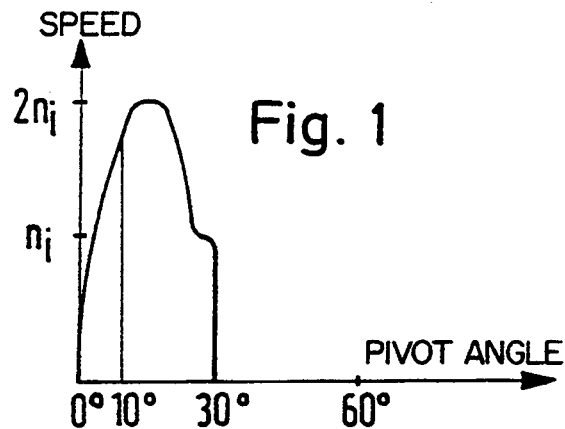
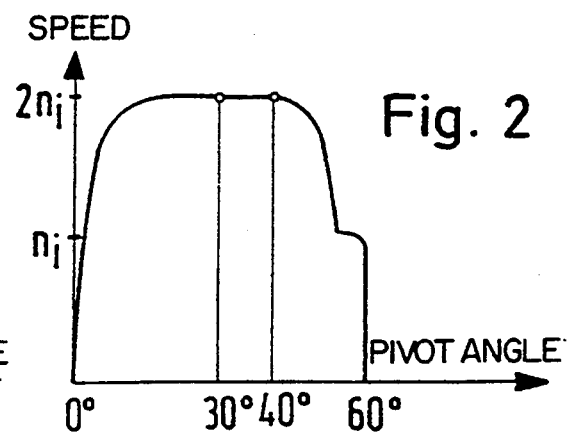
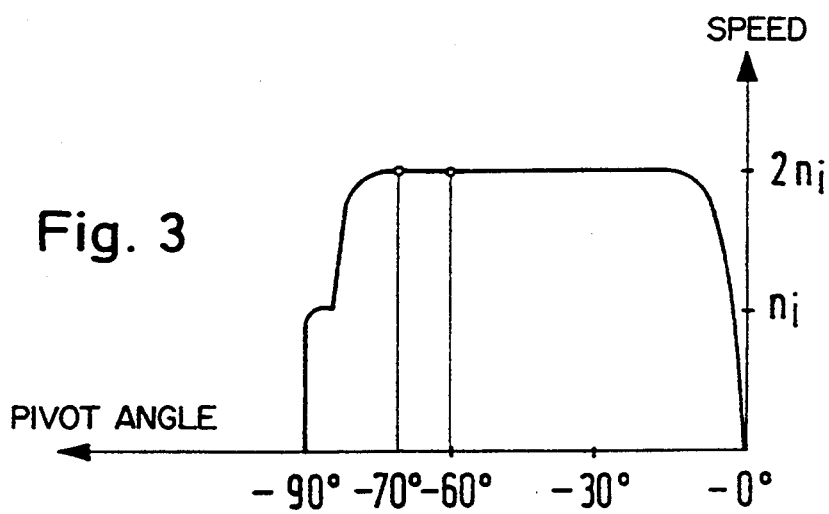
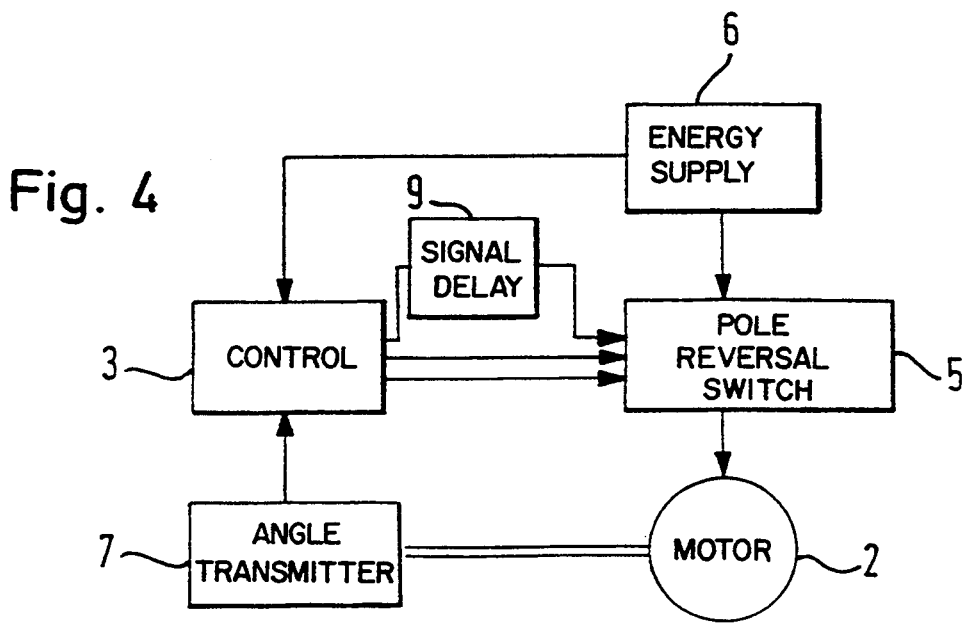

TOOL TURRET WITH REDUCED SWITCHING TIMES

FIELD OF THE INVENTION

The present invention relates to a tool turret having a turret head having recesses for tools, which turret head can be rotated relative to the turret housing into selectable angular positions and can be interlocked in each of these angular positions. A preliminary indexing bolt securely holds the turret head, following a switching process in which the turret head rotates between selectable angular positions, as soon as the turret head has reached the new angular position. A three-phase asynchronous motor serves as rotary drive for the turret head. An interlocking device securely interlocks the turret head in any of the selectable angular positions. A gearing arrangement connects the three-phase asynchronous motor to the turret head. The synchronous speed of the three-phase asynchronous motor is determined such that during turret head rotary movement to a different angular position, the turret head reaches the indexing speed limited on the basis of the preliminary indexing by the preliminary indexing bolt. A control arrangement is provided for the preliminary indexing bolt and the three-phase asynchronous motor.

BACKGROUND OF THE INVENTION

In this tool turret, after the turret head is rotated into a different angular position to position another tool in alignment to be used, the tool turret is brought abruptly to a standstill by the preliminary indexing bolt. The indexing bolt enters a bore in the turret head or in another part connected securely with the turret head. The mechanical load capacity of the parts carrying the load at the time of the abrupt halt of the turret head caused by the preliminary indexing bolt determines the speed of indexing.

The turret head indexing speed is reached at the end of each acceleration phase. The turret head is subsequently moved forward at that speed until the new angular position has been reached. The acceleration phase is relatively short.

The so-called switching time, the time required to rotate the turret head into a new angular position, whatever the angle of rotation, is determined by the indexing speed. Although switching times obtained recently are relatively short, it would be beneficial to attain still shorter switching times.

SUMMARY OF THE INVENTION

Objects of the present invention involve providing a tool turret which attains the desired shortening of the switching time without simultaneously requiring a considerably higher cost outlay.

The foregoing objects are basically attained by a tool turret comprising a turret housing having an annular surface with axially extending teeth and tooth spaces, having a contact surface, and defining a rotational axis perpendicular to the annular surface and the contact surface. A turret head is rotatably mounted in and relative to the turret housing to selectable angular positions about the rotational axis. The turret head has recesses for tools, axially extending teeth and spaces, and an annular surface. A preliminary indexing bolt secures the turret head in one of the angular positions following a switching operation in which the turret head moves between angular positions. A three-phase synchronous motor forms a rotary drive for the turret head. The motor is pole reversible and has at least first and second sets of pole pairs. The first set provides a first indexing speed. The second set has a smaller number of pole pairs then the first set and provides a second indexing speed. An interlocking device securely interlocks the turret head in any of angular positions. The interlocking device includes an interlocking member with axially extending teeth concentrically mounted about rotation axis and a contact surface perpendicular to rotational axis. The interlocking member is axially slidable along the rotational axis between an interlocking position, in which the interlocking member teeth simultaneously engage the teeth and tooth spaces of the turret housing and the turret head and a contact position in which the contact surfaces of the interlocking member and the turret housing engage, precluding engagement of the teeth of the interlocking member and the turret housing in any position other than the selectable angular positions of the turret head. A control member has a central cam rotatable relative to the interlocking member for controlling axial movement of the interlocking member. The control member is rotatably coupled to the motor. Gear means couples the motor to the turret head such that the turret head reaches an indexing speed limited by characteristics of the preliminary indexing bolt. Control means regulates operation of the preliminary indexing bolt and the motor. The control means operates the motor with the first set of pole pairs at a time to ensure deceleration of the turret head to the first indexing speed before movement of the turret head is stopped by the preliminary indexing bolt.

The switching time can be shortened considerably by selecting a smaller number of pole pairs than the number of pole pairs producing the current or normal indexing speed. With a small number of pole pairs a higher turret head speed than the traditional indexing speed can be attained. The turret head movement is accelerated by modification of the angular position to a speed which is higher than the indexing speed, preferably double the indexing speed. To have the indexing occur at indexing speed, the motor need only be reversed again at the correct moment before reaching the new angular position to the number of pole pairs producing the normal indexing speed. The motor then decelerates the turret head to the normal indexing speed, so that the turret head can be halted abruptly by the preliminary indexing bolt.

Sometimes, if the turret head is rotated the distance of only one single switching step, there is insufficient time to accelerate the turret head to a speed significantly higher than the normal indexing speed and then to decelerate the turret head to the original or normal indexing speed at the correct moment before reaching the new angular position. A markedly shortened switching time can be realized. The only problem is the cost outlay required for the pole reversing system, which system actually can be accomplished at relatively low cost. This is particular the case when the stator winding of the three-phase asynchronous motor is constructed for a Dahlander circuit. By using this means, the speed can be increased only to double the value of the normal indexing speed. To attain increased indexing speed, however, two windings in the stator plates need not be arranged as only one single winding with taps is necessary.

For tool turrets wherein the turret head operates successfully by an interlocking mechanism sliding axially along the rotary axis of the turret head, wherein the interlocking mechanism engages by interlocking positioning with a planar toothing system simultaneously in toothed rims located on the turret head and the turret housing, and wherein the axial thrust motion of the interlocking mechanism is controlled by rotation of a control member relative to the interlocking mechanism driven by the drive motor, the mass moment of inertia of the turret head during the deceleration process as a result of pole reversal of the drive motor leads to rotation of the control member relative to the interlocking member. As a result of control member-interlocking member rotation, the interlocking member is moved as though into its interlocking position against the toothed rims of the turret head and of the turret housing.

If, as is the case of known tool turrets, both the planar toothing system of the interlocking member and the toothed rims of the turret head and the turret housing are constructed in the manner of a Hirth gearing arrangement, the teeth of the interlocking member would slide over the teeth of the two toothed rims while generating a strong chattering noise or would even come into engagement in an altogether different rotary position than the new rotary position to be attained. To prevent such a chattering noise and interlocking of the turret head in a different rotary position than the intended new rotary position, the contact surfaces come in contact with one another during the deceleration process, preventing the teeth of the interlocking system from engaging in the tooth spaces of the two annular surfaces of the turret head and turret housing. The contact of the contact surfaces on one another also contributes to balancing of the speed differential occurring during the deceleration process as rapidly as possible.

The signal for pole reversal and with that for the beginning of the deceleration process can be generated from an angular position transmitter of the tool turret. With the angular position transmitter, the signal can be transmitted at the most desirable time point, which is preferably the latest possible time, and corresponds, for instance, to an angular position of 20 degrees in front of the angular position in which the interlocking occurs.

If only one angular position transmitter is available, the transmitter has the capacity to generate a signal only in each angular position for an interlocking. With only one angular position transmitter, the deceleration process would usually begin immediately in the angular position directly preceding the new angular position. This would lead to termination of the deceleration process considerably too early. Thus, the beginning of deceleration is preferably delayed by a signal delay means. In one preferred embodiment, the signal delay means has an adjustable delay time, in order to adapt the time delay to the structural features of the tool turret, and especially to adjust the degree of the angle between two sequential angular positions.

It is especially advantageous to arrange the contact surfaces between the teeth and the tooth spaces. The space required for this is obtained in a simple manner in that the number of teeth and tooth spaces is selected to be identical to the number of possible angular positions of the turret head. Each angular position is associated with one tooth or one tooth space. The interlocking member can then be thrust into the interlocking position only in certain angular positions in which the teeth are in engagement with the tooth spaces, and the engagement is not prevented by the contact surfaces.

Instead of one tooth or one tooth space for each selectable angular position, sets or groups of teeth and tooth spaces can be provided. Sufficient space must remain for the contact surfaces between these sets or groups of teeth and tooth spaces.

Instead of having contact between contact surfaces arranged between the teeth or tooth spaces, the contact surfaces can be provided outside the annular surfaces having the teeth and tooth spaces.

Other objects, advantages and salient features of the present invention will become apparent from the following detail description, which, taken in conjunction with the annexed drawings, discloses preferred embodiments of the present invention.

BRIEF DESCRIPTION OF THE DRAWINGS

Referring to the drawings which form a part of this disclosure:

FIG. 1 is a diagram plotting speed vs. pivot angle for rotation of the turret head through one single switching step in one direction of rotation according to the present inventions;

FIG. 2 is a diagram plotting speed vs. pivot angle for rotation of the turret head through two switching steps in one direction of rotation according to the present invention;

FIG. 3 is a diagram plotting speed vs. pivot angle for rotary movement of the turret head through three switching steps in an opposite direction of rotation according to the present invention;

FIG. 4 is a schematic block diagram of the control and motor for a tool turret according to the present invention;

DETAILED DESCRIPTION OF THE INVENTION

Figure 5:
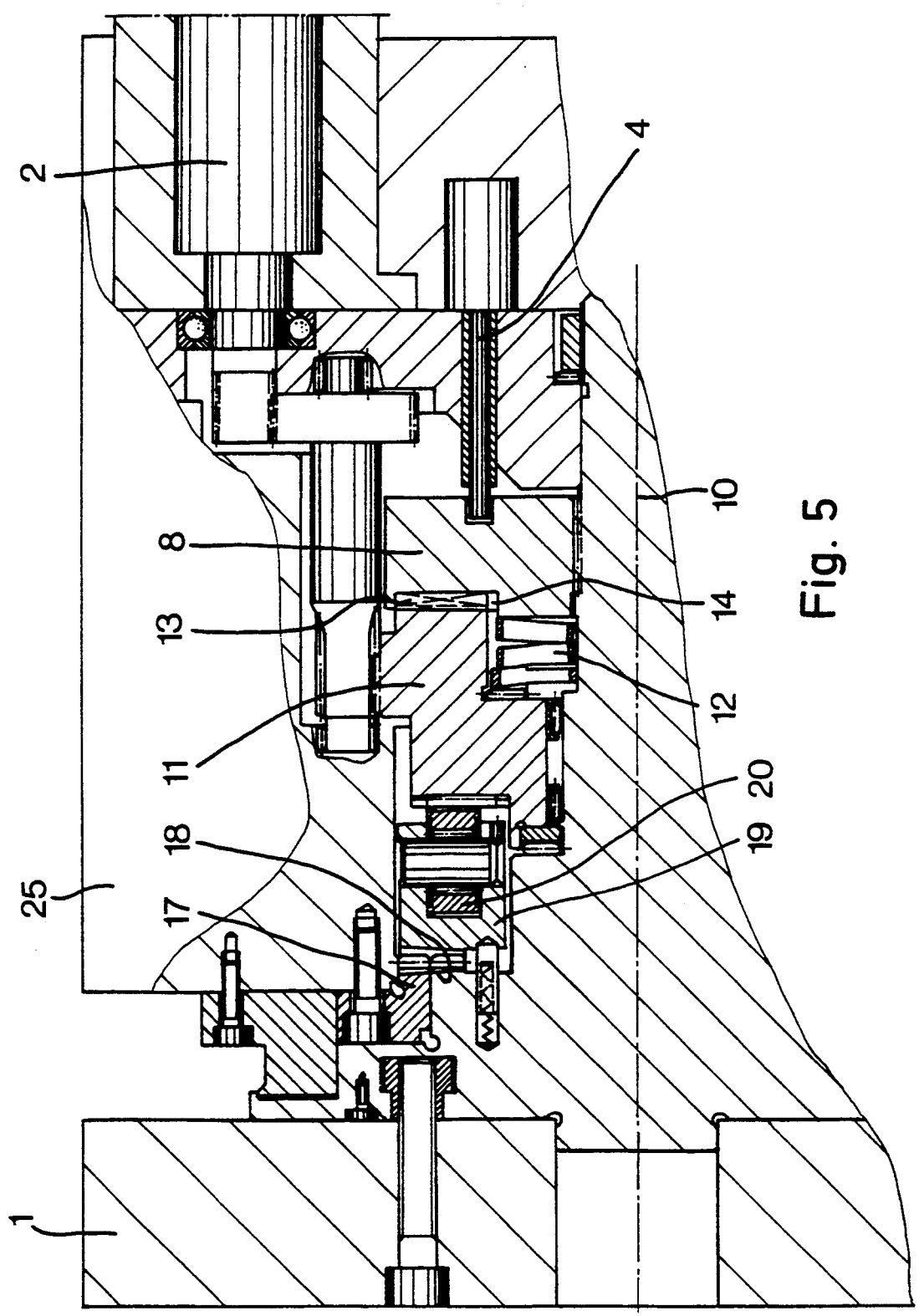
FIG. 5 is a partial, side elevational view in section diagrammatically illustrating a tool turret according to one embodiment of the present invention.

A tool turret comprises turret head 1 which can be set in twelve different angular positions. A switching step, and thus a rotation from one angular position into the sequentially following angular position, extends over a pivot angle of 30 degrees. The tool turret of the present invention differs from the known tool turret of this type because the present invention has a three-phase asynchronous motor 2 serving as the drive for the turret head 1.

A modified control arrangement 3 is provided, along with a construction of the stator winding of the three-phase asynchronous motor 2, to be suitable for a Dahlander circuit. The greater of the two numbers of pole pairs of three-phase asynchronous motor 2 which can be selected is thus associated with the indexing speed, in other words, the speed with which the turret head moves forward into the new angular position.

With the falling in of a preliminary indexing bolt 4 for halting turret head 1 in the new angular position, the permissible mechanical load on the structural parts during the abrupt halting of turret head 1 in the new angular position is not exceeded. The second number of pole pairs which can be selected then yields a maximum speed of turret head 1, which speed is double that of the indexing speed. In the diagrams the indexing speed is indicated with $n_i$ the second speed with $2n_i$.

Since turret head 1 must be rotated forward the distance of only one switching step, which in the exemplary embodiment is only 30 degrees, the method of operation of control arrangement 3 depends upon whether the indexing speed $n_i$ up to the beginning of the deceleration process can be exceeded to a degree which is significant or not. If such excessive deceleration is possible, which is presupposed in FIG. 1, then angular position transmitter 7 of the tool turret delivers a signal to control arrangement 3. Control arrangement 3 may supply signals only in the angular position for interlocking or in other angular positions, at the beginning of the switching process or at a later time point, in the exemplary embodiment at an angular position of 10 degrees.

In the first alternative, the deceleration signal is delayed by a delay member or means 9 to the latest possible time for beginning deceleration. At this time point a switch 5 must have already caused the reversal of three-phase asynchronous motor 2 to the greater number of pole pairs. In the second alternative, no delay member is required, because the angle of rotation at which angular position transmitter 7 generates the signal is selected. With reference to the switching-dependent delays, which in the exemplary embodiment lead to the speed increasing still further, the angle of rotation triggers the deceleration process at the right time. Thus, the indexing speed $n_i$ is attained shortly before the new switching position of turret head 1 is reached, which in the exemplary embodiment is at 30 degrees.

Turret head 1 is then moved forward at the indexing speed $n_i$, until preliminary indexing bolt 4, configured and working in the customary manner, in response to a signal generated by angular position transmitter 7 drops into a bore in turret head 1. In the exemplary embodiment, preliminary indexing bolt 4 enters a bore in a flange like structural part 8 connected securely with turret head 1. Turret head 1 is thus halted abruptly in the new angular position. Thereafter, with the aid of an interlocking device, the turret head is aligned in its exact angular position and is locked therein.

For rotation of turret head 1 for the distance of only one switching step, three-phase asynchronous motor 2 may not accelerate turret head 1 to any considerable degree greater than indexing speed $n_i$. By means of the switching-in signal generated from control arrangement 3 at the beginning of the rotation process, which signal is fed through a direct connection to switch 5, the three-phase asynchronous motor 2 is connected, not with the smaller, but rather with the larger of the two sets of pole pairs, and is connected to energy supply system 6. Turret head 1 is then accelerated in a very short time to indexing speed $n_i$. Turret head 1 is moved forward at this indexing speed until the turret head reaches the next angular position. Indexing bolt 4 drops in place in this new angular position.

However, as shown in FIG. 2, when turret head 1 is to be rotated forward the distance of two switching steps, which in the exemplary embodiment can be a distance of 60 degrees, control arrangement 3 generates a first signal fed over a second direct connection to switch 5. On the basis of this first signal, switch 5 selects the smaller of the two sets of pole pairs and connects three-phase asynchronous motor 2 with energy supply system 6. Turret head 1 is accelerated to double the value of the indexing speed, i.e., to the speed $2n_i$. The turret head proceeds to the next angular position at this speed.

With angular position transmitter 7 being driven directly and indirectly by three-phase asynchronous motor 2, a deceleration signal is generated in a subsequent angular position which is shown 10 degrees further on in the exemplary embodiment. This deceleration signal appears at an output from control arrangement 3 connected with the input of adjustable signal delay member 9. The adjustable delay time of signal delay member 9 is selected so the pole reversal of three-phase asynchronous motor 2 occurs at its higher number of pole pairs, at a time, which, in the exemplary embodiment, corresponds to a pivot or rotation angle of approximately 10 degrees. When no signal delay member is required, the control arrangement obtains the deceleration signal at the correct time and feeds it to switch 5.

As a result of the hypersynchronous course of three-phase asynchronous motor 2 following the pole reversal, this motor halts turret head 1 until it reaches indexing speed $n_i$. This indexing speed is attained shortly before turret head 1 reaches the new angular position at 60 degrees from its starting point. On the basis of a signal from angular position transmitter 7, preliminary indexing bolt 4 can drop in and turret head 1 can be abruptly halted. Simultaneously, by a signal transferred directly from control arrangement 3 to switch 5, three-phase asynchronous motor 2 is separated from energy supply system 6. The concurrent exact positioning of turret head 1 and its interlocking in the new position occurs in the manner described hereinafter.

As shown in FIG. 3, turret head 1 can be rotated into a new angular position, not only in one direction, but also in the opposite direction. FIG. 3 shows this rotation in the example of a rotation for the distance of three switching steps. Following acceleration to maximum speed $2n_i$, and for instance during execution of the next to last angular positioning, the control arrangement 3 generates the deceleration signal. The deceleration signal at first is still ineffective, while being delayed by a signal delay member 9. The deceleration process caused by a pole reversal, as shown in FIG. 3. is introduced at a time which assures that indexing speed $n_i$ is reached just prior to the new angular position. In this position, turret head 1 is again halted by preliminary indexing bolt 4, three-phase asynchronous motor 2 is disconnected from energy supply system 6, and turret head 1 is precisely aligned and interlocked in its new angular position.

The switching times in one single switching step and in one rotation through more than one switching step cannot be reduced by half. With rotation of turret head 1 through at least two switching steps, however, as is clear from a comparison of the diagrams shown in FIGS. 2 and 3 with a diagram in which the maximum speed is identical to the indexing speed $n_i$, the switching times can be reduced at least to 80%–70% of the switching time which is obtained with a pivot movement at the indexing speed $n_i$.

As shown in FIG. 5, three-phase asynchronous motor 2 drives control member 11, arranged rotatably on a drive shaft 10, through an intermediate drive gearing. The control member has a curved cam shape on its side or face directed toward turret head 1. Control member 11 is supported by a set of springs 12. The springs are supported on a shoulder of drive shaft 10. Drive shaft 10 is screwed together with turret head 1. Springs 12 exert a spring or biasing force on control member 11 directed against turret head 1.

Figure 6:
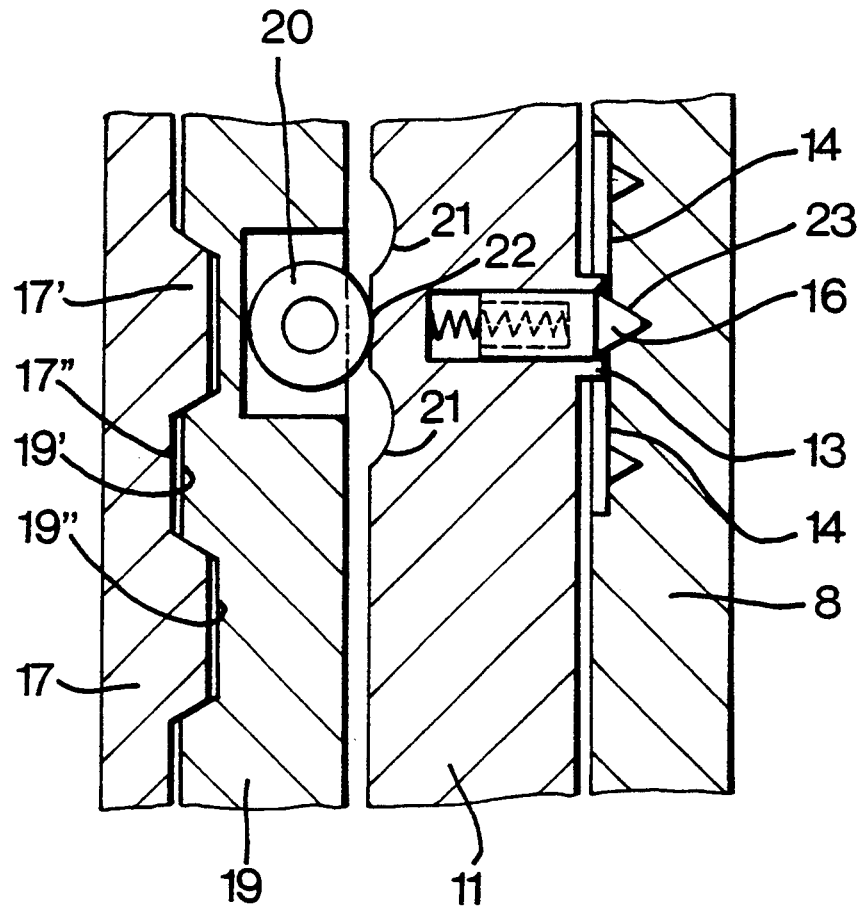
FIG. 6 is a partial, enlarged side elevational view of the interlocking arrangement and the associated control member in the interlocking position of the interlocking member of the tool turret of FIG. 5.
Figure 7:
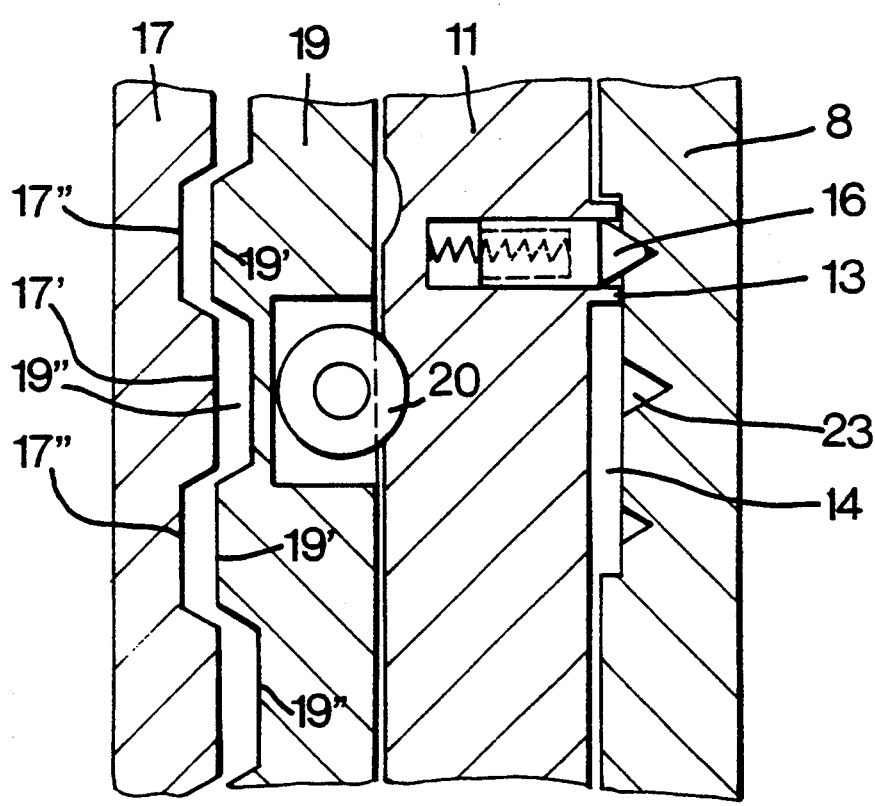
FIG. 7 is a side elevational view in section corresponding to that of FIG. 6, but with the turret head in an unlocked state.

Drive shaft 10 is driven from control member 11 through pawls 13 projecting axially and rearwardly. Each pawl 13 is engaged in a groove 14 in the flange-shaped structural part 8 of drive shaft 10. As shown in FIGS. 6 and 7, the width of grooves 14, measured in the direction of the circumference, is considerably greater than the transverse width of pawls 13, measured in the sme manner or direction. Spring-biased bolts 16, fitted into pawls 13, are guided into axial conical bores 23. The bolts catch in the middle position of control member 11, as well as in two end positions, in conical bores 23 provided on the bottom of grooves 14.

For interlocking of turret head 1 in any of the selectable angular positions, a ring 17 arranged concentric to drive axis 10 is screwed and fixed together with turret housing 25. Ring 17 has planar toothing on its working side or face directed toward control member 11. The toothing comprises a number of teeth 17' identical to the number of selectable angular positions and a corresponding number of tooth spaces 17''. As shown in FIGS. 6 and 7, the teeth 17' and the tooth spaces 17'' have trapezoidal profiles. A correspondingly configured face gear or tooth ring 18 is provided on a flange part of drive shaft 10. In the selectable angular positions of turret head 1, the teeth of tooth ring 18 coincide with teeth 17' and the tooth spaces of tooth ring 18 correspond with tooth spaces 17''. Also, the tops of the teeth all lie in one single radial plane.

Between ring 17 and tooth ring 18 on the one side and the curved cam control member 11 on the other side, an interlocking member 19 is arranged. Interlocking member 19 is rotatable on drive shaft 10 and is longitudinally slidable. The interlocking member working side or face directed toward ring 17 and tooth ring 18 has a number of teeth 19' and tooth spaces 19'' corresponding to the number of selectable angular positions. Teeth 19' and tooth spaces 19'' have profiles identical to those of teeth 17' and tooth spaces 17''. Also, the top ends of teeth 19' likewise lie in one common radial plane.

Rolls 20 are mounted rotatably in interlocking member 19 and run on the curved sector of control member 11. Control member 11 forms a planar segment 22 for each of the rolls 20 between two adjacent depressions 21. As shown in FIG. 6, when interlocking member 19 is located in its interlocking position, roll 20 rests on planar segment 22. In this position, bolt 16 is fitted into the middle conical bore 23 in the bottom of groove 14. Turret head 1 is thereby locked in position, so that the three-phase asynchronous motor 2 at this point merely sets control member 11 in rotation. Roll 20, according to the direction of rotation of control member 11, enters into one or the other of the two depressions 21, causing interlocking member 19 to be moved into the position shown in FIG. 7. In the FIG. 7 position, teeth 19' are raised completely out of tooth spaces 17'' of ring 17 and also out of those of tooth ring 18. As likewise shown in FIG. 7, pawls 13 have come into contact with the side limiting surfaces of grooves 14.

Figure 8:
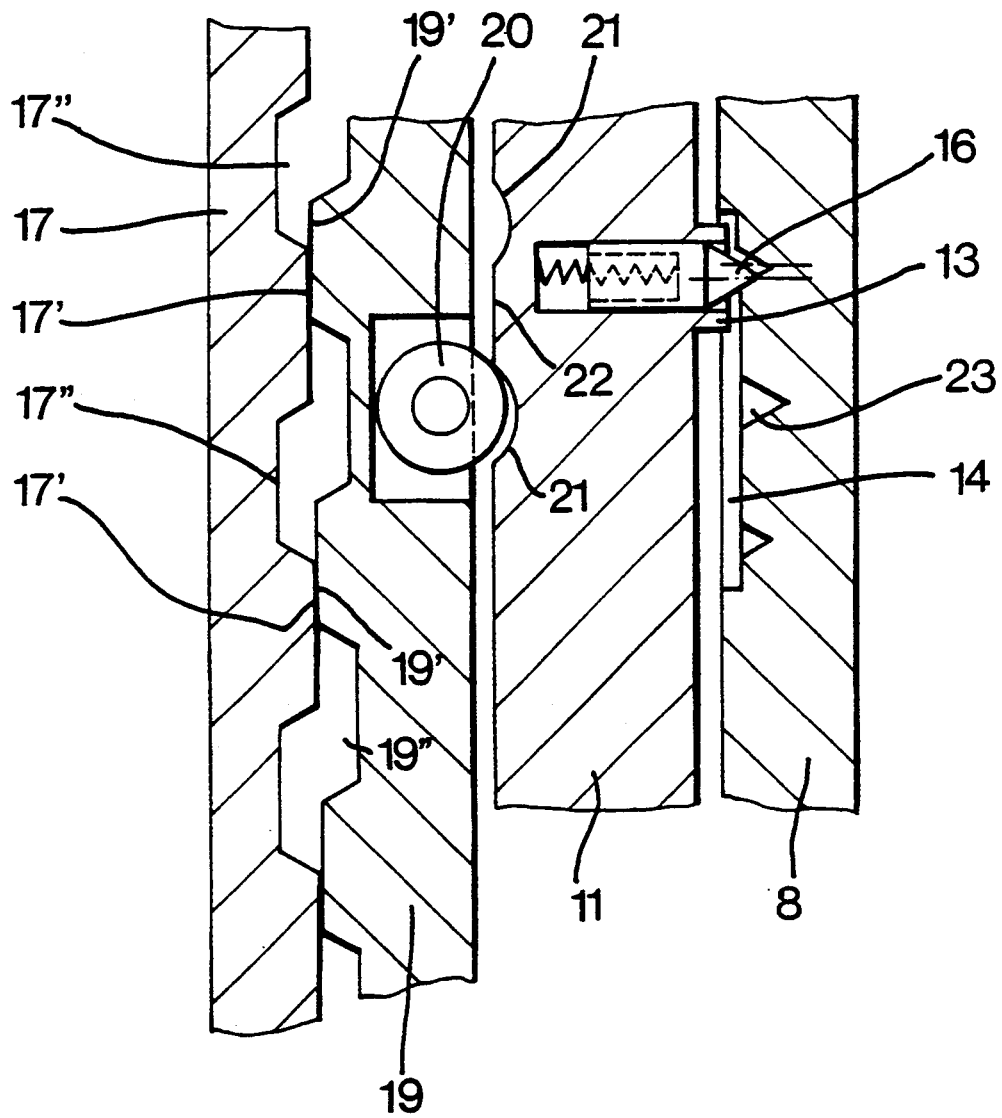
FIG. 8 is a side elevational view in section corresponding to those of FIGS. 6 and 7 of the interlocking member and the control member during the deceleration process as a result of a pole reversal of the drive motor.

For the purposes of deceleration of the rotating masses, as soon as three-phase asynchronous motor 2 is switched to the greater number of pole pairs, a braking torque is exerted on control member 11. This braking torque decreases the speed of control member 11 relative to the speed of interlocking member 19. Member 19 is therefore moved axially counter to ring 17 and tooth ring 18, because rolls 20 move up the slope to planar segment 22. The axial movement of interlocking member 19 is then terminated, so that the top surfaces of teeth 19' come into contact with the top surfaces of teeth 17', as shown in FIG. 8. The top surfaces then form contact surfaces, which, during the deceleration process, prevent teeth 19' from coming into engagement with any of the tooth spaces 17''.

The tightening or engagement of teeth 19' against the top surfaces of teeth 17' sustains the deceleration of interlocking member 19, and, at the end of the deceleration process, the realignment of rolls 20 in the deepest points of depressions 21. Following the preliminary indexing, the interlocking member 19 can be moved in the opposite direction of rotation by rotation of control member 11 into the interlocking position in which teeth 19' engage, without any play, with tooth spaces 17'' as well as the corresponding tooth spaces of tooth ring 18. When control member 19 is rotated in the opposition direction of rotation, pawls 13 are again aligned on the middle of grooves 14, and bolts 16 drop into or engage the middle tapered bore.

Figure 9:
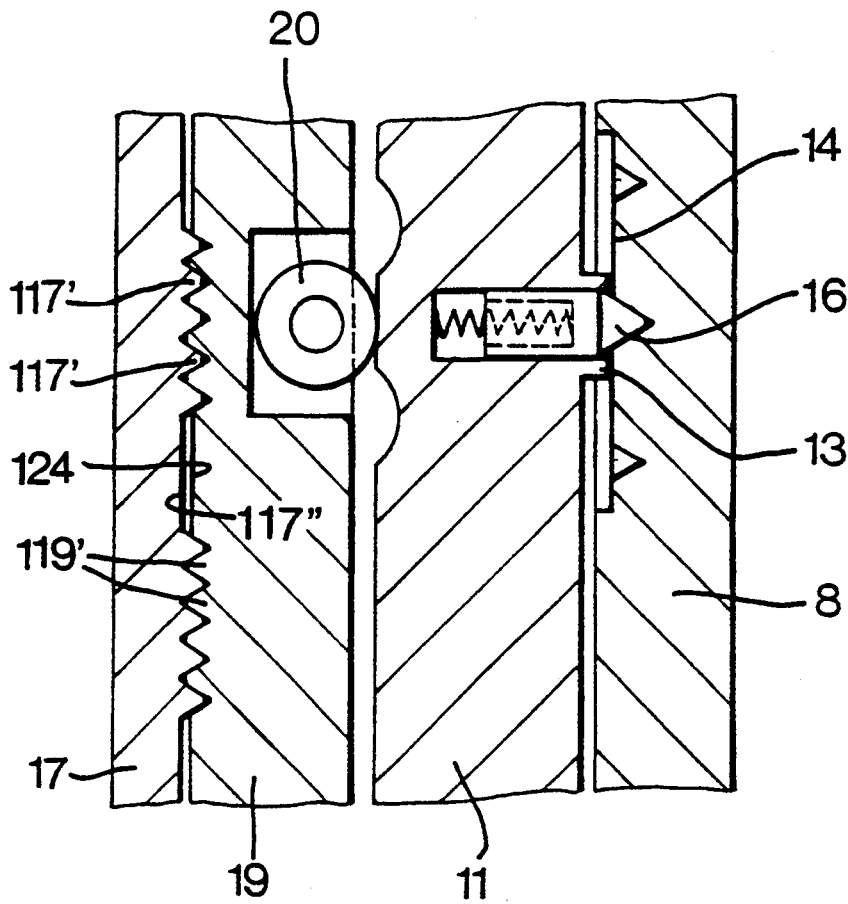
FIG. 9 is a partial side elevational view in section of a tool turret according to a second embodiment of the present invention with the interlocking member and control member interlocked.
Figure 10:
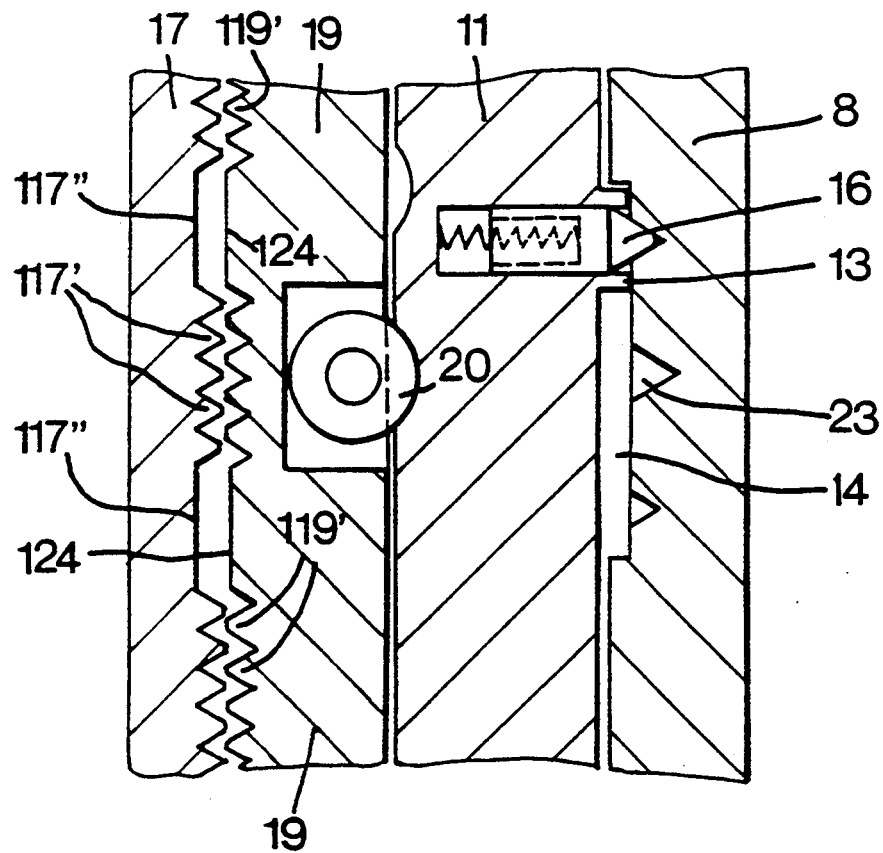
FIG. 10 is a side elevational view in section of the tool turret of FIG. 9 with the turret head in an unlocked state.

As shown in FIGS. 9 and 10, instead of only one single tooth per selectable angular position, a group or set to teeth per position can be provided. The teeth have the traditional profile shapes of conventional tool turrets. When interlocking member 19 is in the interlocking position, for instance, four teeth 119' are engaged with four tooth spaces 117'' of ring 17. The planar contact surfaces 124 between the groups of teeth 119', stand slightly above the radial plane defined by the top surfaces of teeth 119'. The spaces 117'' between the groups of teeth 117' of ring 17, as shown in FIG. 9, are formed such that when interlocking member 29 is in the interlocking position, the contact surfaces 124 can be fitted completely into these tooth spaces 117''.

The end of the rotary movement of turret head 1 into the new angular position is attained by the pole reversal of three-phase asynchronous motor 2. When interlocking member 19 is moved against ring 17, contact surfaces 124 come into contact on the top surfaces of teeth 117' of ring 117. As in the embodiment of FIGS. 6 to 8, the chattering noise, as well as the interlocking of the turret head in an incorrect angular position, are both reliably precluded.

While various embodiments have been chosen to illustrate the invention, it will be understood by those skilled in the art that various changes and modifications can be made therein without departing from the scope of the invention as defined in the appended claims.

What is claimed is:

1. A tool turret, comprising:
a turret housing having an annular surface with axially extending teeth and tooth spaces, having a contact surface, and defining a rotational axis perpendicular to said annular surface and said contact surface;

a turret head rotatably mounted in and relative to said turret housing to selectable angular positions about said rotational axis, said turret head having recesses for tools, axially extending teeth and tooth spaces, and an annular surface;

a preliminary indexing bolt for securing said turret head in one of said angular positions following a switching operation in which said turret head moves between angular positions;

a three-phase asynchronous motor forming a rotary drive for said turret head, said motor being pole reversible and having at least first and second sets of pole pairs, said first set providing a first indexing speed, said second set having a smaller number of pole pairs then said first set and providing a second indexing speed;

an interlocking device for securely interlocking said turret head in any of said angular positions, said interlocking device including an interlocking member with axially extending teeth concentrically mounted about said rotational axis and a contact surface perpendicular to said rotational axis, said interlocking member being axially slidable along said rotational axis between an interlocking position, in which said interlocking member teeth simultaneously engage said teeth and tooth spaces of said turret housing and said turret head, and a contact position in which said contact surfaces of said interlocking member and said turret housing engage precluding engagement of said teeth of said interlocking member and said turret housing in any position other than said selectable angular positions of said turret head;

a control member having a control cam rotatable relative to said interlocking member for controlling axial movement of said interlocking member, said control member being rotatably coupled to said motor;

gear means for coupling said motor to said turret head such that said turret head reaches an indexing speed limited by characteristics of said preliminary indexing bolt; and control means for regulating operation of said preliminary indexing bolt and said motor, said control means operating the motor with said first set of pole pairs at a time to ensure deceleration of said turret head to said first indexing speed before movement of said turret head is stopped by said preliminary indexing bolt.

2. A tool turret according to claim 1 wherein said three-phase asynchronous motor comprises a Dahlander stator winding.

3. A tool turret according to claim 1 wherein said control means comprises an angular position transmitter which supplies a deceleration signal in an angular position of the turret head corresponding to a deceleration beginning to trigger a pole reversal in said motor.

4. A tool turret according to claim 1 wherein said control means comprises an angular position transmitter causing generation of a preliminary signal during switch of said turret head from one of said selectable angular position to another when said turret head is in an angular position located directly before a new intended one of said selectable angular position, said preliminary signal providing an interlocking in response to a signal triggering time delayed introduction of operation of deceleration.

5. A tool turret according to claim 4 wherein said control means comprises an adjustable signal delay means for adjustably setting a time delay between triggering said deceleration signal and said preliminary signal.

6. A tool turret according to claim 1 wherein said contact surfaces comprise top surfaces of said teeth of said turret housing and said interlocking member.

7. A tool turret according to claim 1 wherein said contact surfaces comprise surfaces between teeth of said turret housing and said interlocking member.

8. A tool turret according to claim 1 wherein said contact surfaces on said turret housing and said interlocking member are outside annular surfaces incorporating said teeth and tooth surfaces thereof.

9. A tool turret according to claim 8 wherein said teeth and tooth spaces correspond in number to said selectable angular positions of said turret head, with one of said teeth and one of said tooth spaces being associated with each of said selectable angular positions.

10. A tool turret according to claim 9 wherein a set of a plurality teeth and tooth spaces are associated with each of said selectable angular positions.

* * * * *